Oct. 6, 1959     R. H. DIERSTEIN     2,907,966
CORE MEMBER FOR INDUCTIVE DEVICE
Filed May 24, 1955     3 Sheets-Sheet 1
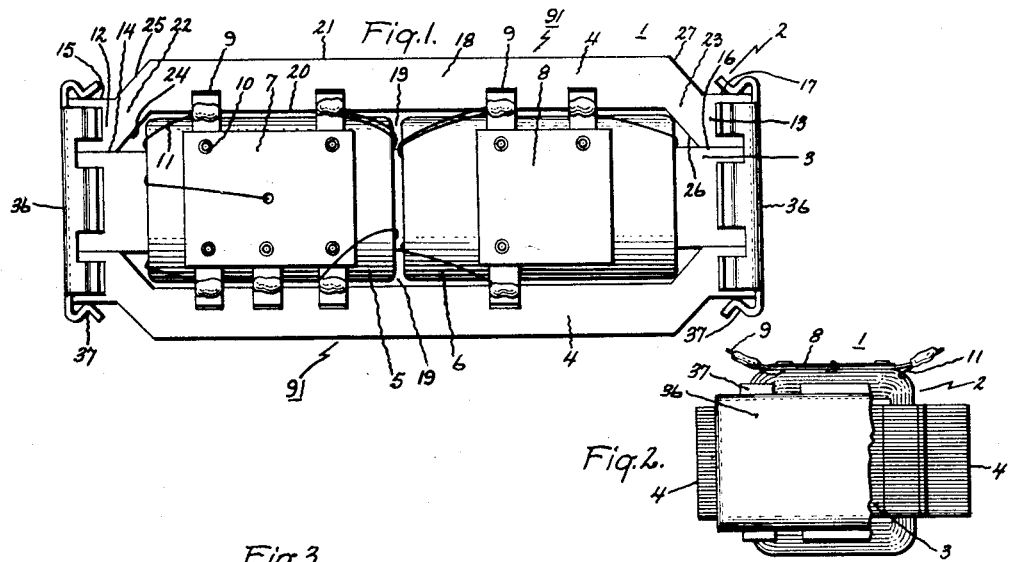
Fig.1.
Fig.2.
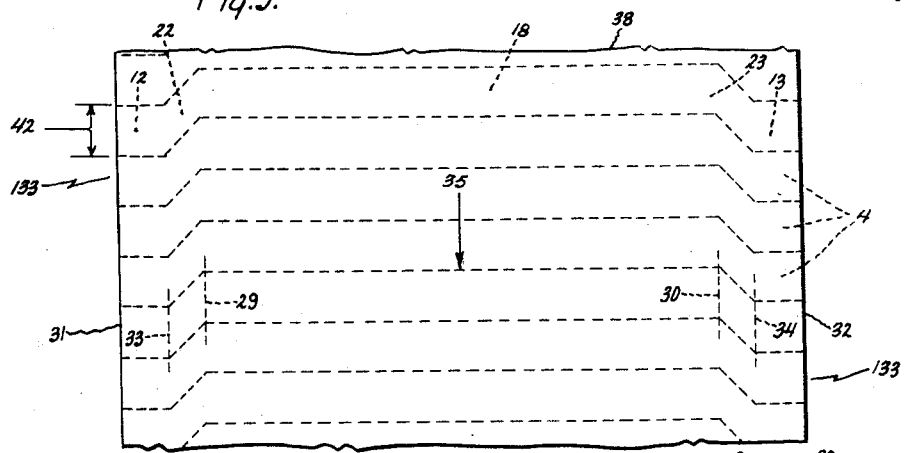
Fig.3.
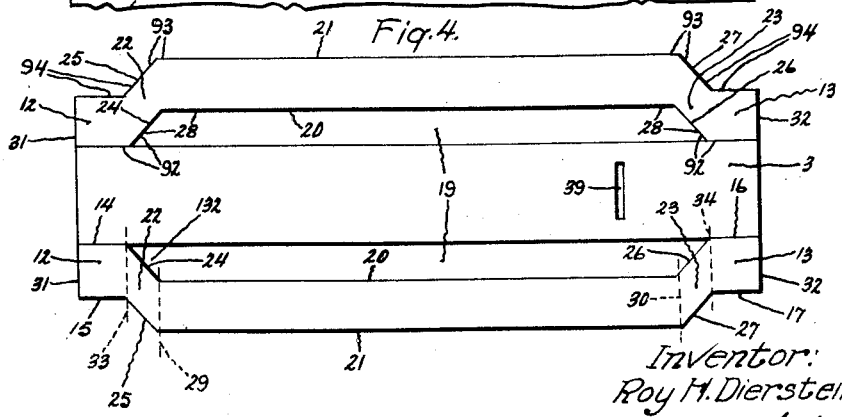
Fig.4.
Inventor:
Roy H. Dierstein,
by    *Robert G. Irus*
His Attorney.

Oct. 6, 1959 R. H. DIERSTEIN 2,907,966
CORE MEMBER FOR INDUCTIVE DEVICE
Filed May 24, 1955 3 Sheets-Sheet 3
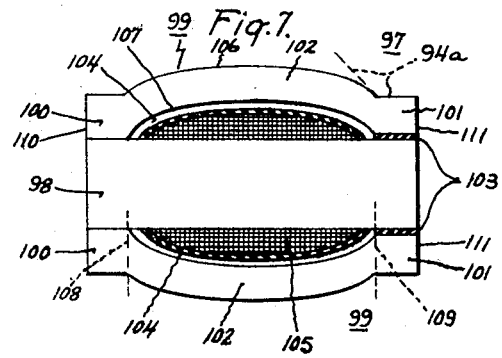
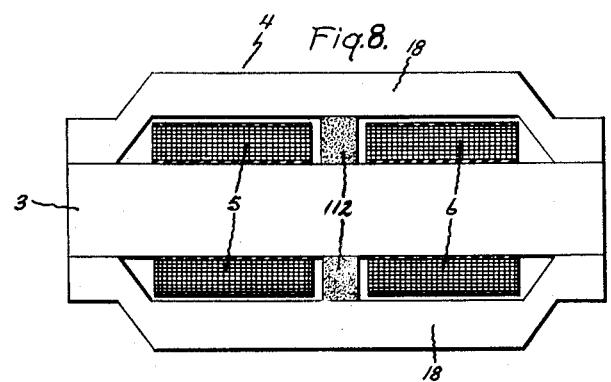
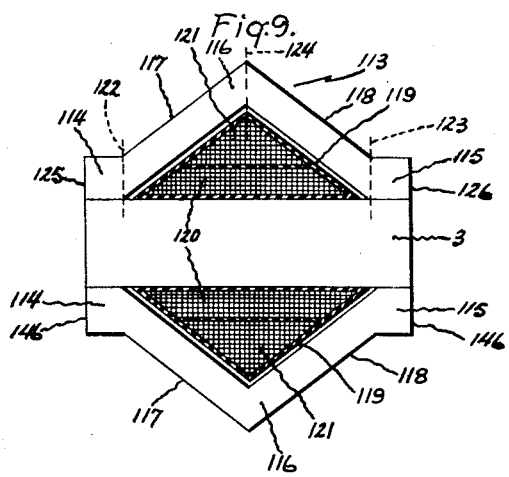
Inventor:
Roy H. Dierstein,
by His Attorney.

United States Patent Office 2,907,966
Patented Oct. 6, 1959

2,907,966

CORE MEMBER FOR INDUCTIVE DEVICE

Roy H. Dierstein, Fort Wayne, Ind., assignor to General Electric Company, a corporation of New York Application May 24, 1955, Serial No. 510,765

21 Claims. (Cl. 336—165)

This invention relates to inductive devices, such as transformers and reactors, and more particularly to the magnetic core members for such devices.

Inductive devices, such as transformers and reactors, are conventionally used to modify either the voltage or current of an alternating current system; the voltage being modified, i.e., increased or decreased, in the case of a transformer, and current being limited in the case of a reactor. Frequently, the functions of voltage modification and current limitation are combined in a single inductive device, commonly referred to as a high reactance transformer. All these devices include a core formed of magnetic material with one or more coils formed of wire, such as copper or aluminum, positioned thereon, the core forming a path for the magnetic flux produced by the coils. In order to reduce eddy currents, these cores are conventionally formed of a stacked plurality of relatively thin laminations of magnetic material, i.e., iron or steel.

In the past, the cores for many inductive devices, particularly high reactance transformers used as ballasts for arc discharge devices such as fluorescent lamps, have commonly been of the shell-type with an elongated substantially straight center member on which the coils are arranged and outer yoke members surrounding the coils and forming a return path for the magnetic flux. A typical example of such a construction is shown in Patent 2,562,693 to Wesley W. Brooks, issued July 31, 1951, and assigned to the assignee of the present application. It will be observed that in the construction of the Brooks patent, the yoke members comprise an outer portion spaced from and parallel with the center elongated member and a plurality of leg portions extending toward and supported against a side of the elongated member. The laminations which comprise these yoke members are conventionally punched from an elongated strip of relatively thin magnetic material and it will be readily apparent that the material punched out from between the leg portions is wasted, thus adding appreciably to the overall cost of the device. While these laminations have in the past been nested in the punching operation, i.e., arranged with the leg portions of one lamination projecting into the space between the leg portions of another lamination, a considerable amount of the magnetic material has still been wasted in the punching operation.

In addition, since the dies used in punching yoke laminations of the type shown in the aforementioned Brooks patent were required to cut completely around each lamination, the die life, i.e., the number of strokes between sharpening of the die, was relatively short. Furthermore, the dies used in punching these yoke laminations were somewhat inflexible in that they could only be used for punching one size of lamination and thus different dies were required for each different size of yoke lamination. These factors contributed to a relatively high tool cost involved in producing yoke laminations of this type. In addition, when the yoke laminations were nested in order to reduce waste, the resultant width of the strip or scroll of magnetic material from which they were punched was greater than the corresponding width of the strip or scroll of magnetic material from which the elongated member laminations were punched, thus requiring the maintenance of an inventory of a number of different widths of magnetic material.

It is therefore desirable to provide a core for a shell type inductive device, such as a transformer or reactor, in which the yoke members of the core are provided with a configuration such that they may be supported against the sides of the central coil supporting core member and yet there is essentially no waste of material involved in punching the laminations. It is further desirable that these yoke members provide, if desired, magnetic shunts between the coils and series air gaps as shown in the aforesaid Brooks patent. It is also desirable that the laminations comprising these yoke members be suitable for production with tools having a lower inital cost and longer life that the tools used to produce prior yoke laminations. It is further desirable that these yoke laminations permit flexibility in tool utilization so that completely different tooling is not necessary for each different size yoke lamination. It is additionally desirable that the yoke laminations and elongated member laminations be produced from strips or scrolls of magnetic material of the same width, thereby reducing the number of widths of magnetic material which must be maintained in inventory.

It is, therefore, an object of this invention to provide an improved core member for a shell type inductive device.

Another object of this invention is to provide an improved yoke member for the core of a shell type inductive device having a configuration such that it may be supported against a side of a straight coil supporting core member yet essentially no waste of material is involved in its manufacture.

A further object of this invention to provide an improved yoke member for the core of a shell type inductive device incorporating the desirable features set forth above.

Another object of this invention is to provide improved laminations for the yoke member of the core of a shell type inductive device which can be successively cut-off essentially without waste from an elongated strip of relatively thin magnetic material having a strip width equal to the length of the center elongated core member.

Yet another object of this invention is to provide an improved lamination for the yoke member of the core of an inductive device characterized by the provision of spaced portions each having its edges parallel with each other and with the edges of the other spaced portion, and a center portion joining the spaced portions and forming obtuse angles therewith so that such laminations may be successively cut off from an elongated strip of relatively thin magnetic material essentially without waste.

A still further object of this invention is to provide an improved method of making laminations for the yoke member of the core of a shell type inductive device in which essentially no waste of magnetic material is involved.

Further objects and advantages of this invention will become apparent and the invention will be better understood by reference to the following description and the accompanying drawings, and the features of novelty which characterize this inveniton will be pointed out with particularity in the claims annexed to and forming a part of this specification.

This invention in one of its broader aspects, provides a magnetic core structure for inductive devices having an elongated substantially straight member formed of magnetic material and a yoke member associated therewith formed of a stacked plurality of relatively thin laminations of magnetic material. The yoke member comprises a pair of spaced portions each having its laminated sides parallel with each other and with the sides of the other portion and with one laminated side of each of the spaced portions being positioned adjacent a side of the elongated member; and a center portion joining the spaced portions and respectively forming obtuse angles therewith thereby defining a coil receiving window with the elongated member. The angles formed by the sides of the spaced portions and the sides of the center portion are thus obtuse with each angle formed at one side of the yoke member being the 360° supplement of a respectively angle formed at the other side of the yoke member, thereby permitting the laminations comprising the yoke member to be successively cut-off from a sheet of magnetic material without waste.

In the drawings,

Fig. 1 is a top view of a high reactance transformer incorporating the improved core construction of this invention;

Fig. 2 is an end view, partly broken away, of the transformer of Fig. 1;

Fig. 3 shows a portion of a sheet of relatively thin magnetic material from which the laminations comprising the yoke members of Figs. 1 and 2 are punched and further shows how the configuration of these laminations eliminates waste;

Fig. 4 is a top view of a single set of laminations for the core of the transformer of Fig. 1;

Fig. 7 is a top view, partly in section, showing a reactor incorporating a modified form of the improved core of this invention;

Fig. 8 is a top view, partly in section, showing a high reactance transformer constructed in accordance with this invention and utilizing separate insertable magnetic shunts; and Fig. 9 is a top view, partly in section, showing a low reactance transformer incorporating another modified form of the improved core construction of this invention.

Figure 5:
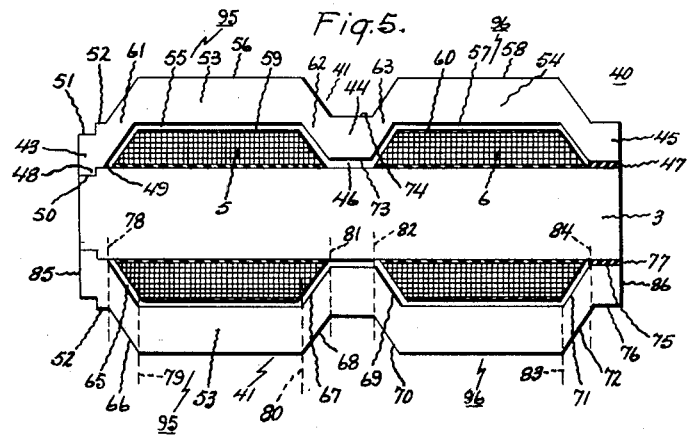
Fig. 5 is a top view, partly in section, showing a high reactance transformer having a modified form of the improved core of this invention including magnetic shunts and series air gaps.

Referring now to Figs. 1 to 4 inclusive, there is shown a high reactance transformer, generally identified as 1, of the type used for starting and operating arc discharge devices, such as fluorescent lamps. The transformer 1 includes a magnetic core 2 comprising an elongated substantially straight center winding leg member 3 and a pair of outer yoke members 4. The center winding leg member 3 and the outer yoke members 4 are respectively formed of a stacked plurality of relatively thin laminations of magnetic material, as better shown in Fig. 2. Coils 5 and 6 are positioned on center winding leg member 3 in spaced relationship, and in the embodiment shown, coil 5 forms the primary winding while coil 6 forms the secondary winding of the transformer. Coils 5 and 6 may be connected to form an isolated transformer, or may be connected in autotransformer relationship, the specific connections of the coils 5 and 6 not forming a part of this invention. Terminal pads 7 and 8 formed of suitable material are secured on the upper surfaces of coils 5 and 6 respectively and have terminals 9 secured thereto by suitable rivets 10. Leads 11 from coils 5 and 6 are brought out and secured to terminals 9, as by soldering, and the necessary external connections to the device may then be made to the terminals 9.

Each yoke member 4 is formed with spaced end portions 12 and 13 each having sides 14 and 15, and 16 and 17 respectively parallel with each other in order that the spaced end portions 12 and 13 may be arranged with the laminated edges of their sides 14 and 16 respectively abutting the laminated edges of the straight flat sided center winding leg member 3, as shown. Yoke members 4 further comprise center portions 91 joining end portions 12 and 13 and formed of intermediate portions 18 spaced from the center winding leg member 3 thereby defining coil receiving windows 19 therewith for accommodating coils 5 and 6, and connecting portions 22 and 23. Intermediate portions 18 have parallel sides 20 and 21. Connecting portions 22 and 23 respectively integrally connect spaced end portions 12 and 13 and intermediate portions 18 and respectively have parallel sides 24 and 25, and 26 and 27. As will more clearly be seen in Fig. 4, sides 24 and 26 of connecting portions 22 and 23 respectively form obtuse angles 28 with sides 20 of intermediate portions 18, obtuse angles 92 with sides 14 and 16 of spaced end portions 12 and 13 respectively, and corresponding acute angles 132 with center winding leg member 3 thereby giving the coil receiving window 19 a trapezoidal configuration. It will also be seen that the sides 25 and 27 of connecting portions 22 and 23 respectively form obtuse angles 93 with sides 21 of intermediate portions 18 and obtuse angles 94 with sides 15 and 17 of spaced end portions 12 and 13 respectively; angles 28 and 92 being the 360° supplement of angles 93 and 94 respectively. As will also be more clearly seen in Figs. 3 and 4, the lines 29 and 30 joining the sides 24 and 25 of connecting portions 22 and sides 26 and 27 of connecting portion 23 to sides 20 and 21 of intermediate portion 18 are respectively parallel to each other, parallel to the ends 31 and 32 of spaced end portions 12 and 13, and parallel to the direction of movement of the strip 38 of magnetic material from which the laminations forming the yoke members 4 are cut off, as shown by arrow 35 in Fig. 3. As will further be seen in Fig. 4, the line 33 joining sides 24 and 25 of connecting portions 22 to sides 14 and 15 of end portions 12 and the line 34 joining sides 26 and 27 of connecting portions 23 to sides 16 and 17 of end portions 13 are also respectively parallel to each other and parallel to lines 29 and 30.

Spring clamps 36 are respectively assembled over end portions 12 and 13 at each end of core 2 in order to hold the device in assembled relation, as shown in Fig. 1. It will be noted that spring fingers 37 of spring clamps 36 engage sides 15 and 17 of end portions 12 and 13 of yoke members 4 and thus do not extend beyond the dimension defined by the outer sides 21 of intermediate portions 18 of yoke members 4.

Reference to Fig. 3 will now clearly indicate that the laminations of yoke members 4 may be successively punched or cut-off from an elongated strip or scroll 38 of relatively thin magnetic material, such as iron or steel, essentially without waste or scrap, thus permitting substantially complete utilization of the magnetic material. It will be seen that end portions 12 and 13, and intermediate portion 18 are arranged transversely of strip 38 while connecting portions 22 and 23 are disposed at obtuse angles with respect to edges 133 of strip 38. It will also be seen that lines 29, 30, 33, and 34 are parallel to edges 133 of strip 38. It will of course be readily apparent that the laminations comprising center winding leg 3 can also be punched or cut-off from an elongated strip or scroll of relatively thin magnetic material without waste and thus a complete shell-type transformer 1 can be manufactured with essentially no waste of expensive magnetic material, thus, in turn, materially reducing the over-all cost thereof.

It will also be readily apparent that this improved yoke construction provides considerable flexibility in the use of tools since laminations for yoke members of different lengths can be made with the same basic dies by merely using different die inserts to provide intermediate portions 18 of different lengths. In addition, laminations comprising the improved yoke members of this invention can be made with relatively inexpensive cut-off dies in contrast with the more expensive dies of the cutall-around type previously used. The life of these cut-off dies is considerably higher than the life of the previous dies, it having been found that cut-off dies used to produce the yoke laminations of Figs. 1 to 4 inclusive will provide between 200,000 and 280,000 strokes between sharpenings compared with 60,000 strokes between sharpenings with dies of the cut-all-around type previously used. It will also be readily apparent that yoke laminations of varying widths may be provided by merely varying the move of the strip 38 of magnetic material in the die, as at 42 in Fig. 3. It will also be seen that the same scroll width is used for the laminations comprising the yoke members 4 and the elongated member 3 thus reducing the inventory of different widths of magnetic material. It will further be observed that the laminations of the improved yoke member of this invention can be cut off either parallel with or at right angles to the grain orientation of the magnetic material. The obtuse angles 28 between the sides 24 and 26 of connecting portions 22 and 23 respectively and side 20 of intermediate portion 18 are preferably between 100° and 170°, and the obtuse angles 92 between the sides 24 and 26 of connecting portions 22 and 23 respectively and sides 14 and 16 of spaced end portions 12 and 13 respectively are thus preferably between 260° and 190° in order to provide an adequate magnetic section in the connecting portions on the one hand, and to provide a coil receiving window 19 of adequate height on the other hand.

A high reactance transformer in accordance with Figs. 1 to 4 inclusive has been constructed. In this device, the height of the stack of laminations of center winding leg member 3 and yoke members 4 was .8125 inch while the overall length of center winding leg member 3 was 4.838 inches. End portions 12 and 13 of yoke members 4 were .381 inch long between ends 31 and 32 and lines 33 and 34 respectively, and .381 inch wide between sides 14 and 15, and 16 and 17 respectively. Connecting portions 22 and 23 were .259 inch wide between sides 24 and 25, and 26 and 27 respectively, and angles 28 were 132 degrees. Intermediate portions 18 were 3.562 inches long between lines 29 and 30 and .381 inch wide between sides 20 and 21. Coil receiving window 19 was 4.076 inches long along center winding leg member 3. The primary coil 5 comprised 822 turns of No. 27 wire and was energized from a 118 volt 60 cycle single phase alternating current source. Secondary coil 6 comprised 1398 turns of No. 28 wire and was connected in autotransformer relationship with the primary coil 5. The device was connected to operate two forty-watt fluorescent lamps in series, a 3.75 microfarad capacitor being connected in series with the two lamps to provide leading lamp current. This arrangement provided approximately 290 volts open circuit across the autotransformer and capacitor. Slot 39 was formed in center winding leg 3, as shown in Fig. 4, in order to provide a series air gap in the magnetic circuit. This arrangement provided a lamp current of .435 amp. and a voltage across both lamps under load of 204 volts. With this arrangement, the portion of the center winding leg 3 under the primary coil 5 was found to have 89,800 lines per square inch while the portion under the secondary coil 6 was found to have 95,000 lines per square inch, the spaced apart relationship of the primary and secondary coils 5 and 6 providing the requisite leakage for the ballasting action.

It will now be readily apparent that this improved core construction provides a transformer having all the advantages of previous constructions at greatly reduced tool and material costs by virtue of the essentially complete elimination of waste of magnetic material and the use of cut-off dies. This is illustrated by the fact that the improved high reactance transformer referred to above cost approximately 10 percent less than the previous design constructed in accordance with the aforesaid Brooks patent for operating the same lamps.

Referring now to Fig. 5, there is shown a high reactance transformer 40 incorporating the improved core construction of this invention, but differing from the embodiment of Figs. 1 to 4 inclusive in the provision of integral magnetic shunts for leakage flux and a different form of series air gap. In this construction, in which like elements are indicated by like reference numerals, center winding leg 3 is again formed of a stacked plurality of relatively thin laminations of magnetic material with primary coil 5 and secondary coil 6 being positioned thereon in spaced relationship. In this embodiment, however, yoke members 41, which again are formed of a stacked plurality of relatively thin laminations of magnetic material, are provided with three spaced portions 43, 44, and 45. All of these spaced portions 43, 44, and 45 have their laminated edges magnetically adjacent the laminated edges of the center winding leg member 3; however, the laminated edge of side 49 of portion 43 is directly abutting center winding leg member 3 while the portions 44 and 45 define shunt and series air gaps 46 and 47 respectively with the center winding leg member 3. Here, a projection 48 is formed on the side 49 of spaced portion 43 and is seated in a corresponding notch 50 in the laminated side of center winding leg member 3 in order to limit relative transverse movement of members 3 and 41. A corresponding notch 51 is formed in the opposite side 52 of spaced portion 43 as shown. Sides 49 and 52 of portion 43 and the corresponding sides of projection 48 and notch 51 are respectively parallel. In this embodiment, two center portions 95 and 96 are provided respectively comprising intermediate portions 53 and 54 having parallel sides 55 and 56, and 57 and 58 respectively and respectively defining coil receiving windows 59 and 60 with center winding leg member 3 for accommodating coils 5 and 6, and connecting portions 61 and 62, and 63 and 64 respectively joining portions 43 and 44 to intermediate portion 53 and portions 44 and 45 to intermediate portion 54. Here again, sides 65 and 66 of connecting portions 61 are parallel, sides 67 and 68 of connecting portions 62 are parallel, sides 69 and 70 of connecting portions 63 are parallel, and sides 71 and 72 of connecting portions 64 are parallel. Likewise, sides 73 and 74 of spaced portions 44 are parallel, with side 73 defining a shunt air gap 46 with the center winding leg member 3, and sides 75 and 76 of spaced portions 45 are parallel, with side 75 defining a series air gap 47 with the laminated side of the center winding leg 3. Here, sheet insulating material 77 is arranged in air gap 47 and the entire device may be clamped together and held in assembled relation by the clamps 36 of Fig. 1. Here again, the lines 78, 79, 80, 81, 82, 83, and 84 respectively joining the junctions of the sides of the connecting portions 61, 62, 63, and 64 with the sides of the intermediate portions 53 and 54 and the sides of the spaced portions 43, 44, and 45 are respectively parallel with each other, parallel to the ends 85 and 86 of spaced portions 43 and 45, and parallel to the direction of movement of the sheet material from which the laminations forming the yoke members are formed in the die. It will also be observed that connecting portions 61, 62, 63 and 64 respectively form obtuse angles with intermediate portions 53 and 54 and spaced portions 43, 44 and 45 thereby giving coil receiving windows 59 and 60 trapezoidal configurations respectively and permitting the laminations forming yoke members 41 and 42 to be successively cut-off from a strip or scroll of relatively thin sheet material without waste, as explained above. It will be readily apparent that portions 44 form magnetic shunts for leakage flux between coils 5 and 6.

Figure 6:
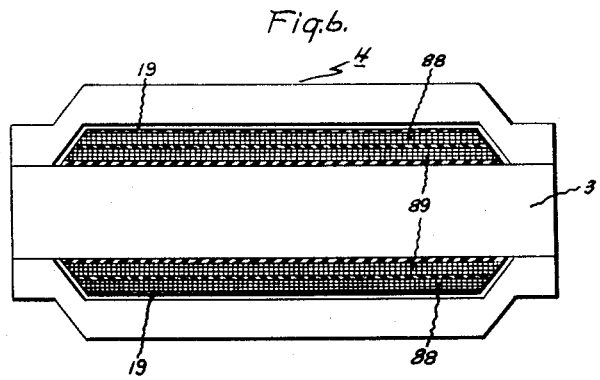
Fig. 6 is a top view, partly in section, showing a low reactance transformer incorporating the improved core construction of this invention.

Referring now to Fig. 6, in which like elements are again indicated by like reference numerals, it is seen that the improved core of Figs. 1 to 4 inclusive may be utilized for a low reactance transformer in which secondary coil 88 is wound over primary coil 89, both the coils being arranged within coil receiving window 19. It will be seen that the core comprising center winding leg member 3 and yoke members 4 is identical to the core shown in Figs. 1 to 4 inclusive with, however, the elimination of the air gap 39 in center winding leg 3 shown in Fig. 4.

Referring now to Fig. 7, there is shown a modified form of the improved core of this invention, in this case incorporated in a reactor. Here, reactor 97 is provided with a center winding leg 98 formed of a plurality of relatively thin laminations of magnetic material. The yoke members 99 are again formed of a stacked plurality of relatively thin laminations of magnetic material and respectively comprise spaced portions 100 and 101 and center portions 102. Spaced portions 100 and 101 have parallel sides and form obtuse angles 94a with the center portions 102 at their joinder, as shown. The laminated edges of the sides of spaced portions 100 are arranged abutting one end of center winding leg member 98 while the laminated edges of the sides of spaced portions 101 define air gaps with the other end of center winding leg member 98, with sheet insulating material 103 being positioned therein. It will be observed that center portions 102 have a curved configuration with their sides 106 and 107 being respectively equally spaced throughout their length. Center portions 102 define coil receiving windows 104 for reactor coil 105 positioned on center winding leg member 91. Here, the lines 108 and 109 joining the sides of spaced portions 100 and 101 to the sides of center portions 102 are parallel with each other, parallel to ends 110 and 111 of spaced portions 100 and 101 respectively, and parallel to the direction of movement of the lamination material in the die. It is thus seen that yoke members 99 may be successively cut-off from a strip of relatively thin magnetic material without waste.

Referring now to Fig. 8, it will be seen that the improved yoke construction of Figs. 1 to 4 inclusive permits the use of separate insertable magnetic shunts between the coils. The spaced apart relationship of the coils 5 and 6 of Figs. 1 to 4 inclusive may provide sufficient reactance, especially when the transformer is utilized for operating a leading current load, as in the example given above. In other specific designs, however, for example, when the transformer is utilized for operating a lagging current load, optimum design may require the use of magnetic shunts between the coils. In Fig. 8, separate insertable magnetic shunts 112 are positioned between coils 5 and 6 and between intermediate portion 18 of yoke member 4 and elongated member 3. Shunts 112 may be of any suitable type well known in the art, for example they may be molded of powdered iron and a suitable resin, formed of sintered material, or formed of a bundle of relatively thin laminations of magnetic material. It will be observed that the use of the separate non-integral shunts 112 of Fig. 8 provides a structure of less over-all length than the device of Fig. 5.

Referring now to Fig. 9, in which like elements are again indicated by like reference numerals, there is shown a low reactance transformer incorporating a modified form of the yoke construction of this invention. Here the intermediate portions 18 of the yoke members 4 of Figs. 1 to 4 inclusive have been eliminated and it will be seen that yoke members 113, which are again formed of a stacked plurality of relatively thin laminations of magnetic material, comprise spaced end portions 114 and 115 and center portions 116 having connecting portions 114 and 115 and center portions 116 having connecting portions 117 and 118. It will again be observed that the sides of spaced portions 114 and 115 and the sides of connecting portions 117 and 118 are respectively parallel. It will also be observed that connecting portions 117 and 118 respectively define obtuse angles with spaced portions 114 and 115 thereby forming coil receiving windows 119. Primary coil 120 is arranged in coil receiving windows 119 and has secondary coil 121 wound thereover. Here again, lines 122 and 123 respectively joining the junctions of the sides of spaced end portions 114 and 115 and connecting portions 117 and 118, and line 124 joining the junctions of the sides of connecting portions 117 and 118 are respectively parallel to each other, to ends 125 and 126 of spaced portions 114 and 115, and parallel to the direction of movement of the magnetic material from which the laminations comprising yoke members 113 are formed in the cut-off die, thereby permitting the laminations to cut-off from an elongated strip of the relatively thin magnetic material essentially without waste, in the manner shown in Fig. 3.

It will now be readily understood that this invention provides an improved core construction for inductive devices wherein waste of the magnetic material in the process of punching the laminations is substantially eliminated and tool costs are reduced thus reducing the cost of the over-all device without affecting the performance.

While I have shown and described particular embodiments of this invention, further modifications and improvements will occur to those skilled in the art and I desire that it be understood therefore that this invention is not limited to the form shown and I intend in the appended claims to cover all modifications which do not depart from the spirit and scope of this invention.

What I claim as new and desire to secure by Letters Patent of the United States is:

1. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being adapted to be positioned magnetically adjacent a side of said elongated member, and a center portion integrally joined to said spaced portions and forming angles therewith thereby being adapted to define a coil receiving window with said elongated member, the angles formed by the laminated sides of said spaced portions and the laminated sides of said center portion being obtuse, each said obtuse angle formed at one laminated side of said yoke member being the 360° supplement of a respective angle formed at the other laminated side of said yoke member.

2. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being in substantially straight alignment and positioned magnetically adjacent a side of said elongated member, and a center portion integrally joined to said spaced portions, said center portion forming obtuse angles respectively with said spaced portions and thereby being adapted to define a coil receiving window with said elongated member, said center portion having two laminated sides equally spaced throughout their length, the lines joining the junctions of the laminated sides of said center portion and the laminated sides of said spaced portions being respectively parallel with each other and with the ends of both of said spaced portions.

3. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being adapted to be positioned magnetically adjacent one side of said elongated member, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming obtuse angles with said intermediate portion and said spaced portions, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

4. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being in substantial straight alignment and positioned extending alongside said elongated member, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming angles between 100° and 170° with said intermediate portion and between 260° and 190° with said spaced portions, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

5. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel wtih each other and with the laminated sides of the other spaced portion, at least one of said spaced portions being adapted to be positioned with one of said laminated sides abutting said elongated member, the other of said spaced portions being adapted to be positioned with one of said laminated sides magnetically adjacent said elongated member, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming obtuse angles with said intermediate portion and said spaced portions, said connecting portions respectively having parallel laminated sides, the lines joining the junctions of the laminated sides of said connecting portions and the laminated sides of said intermediate portions and the lines joining the junctions of the laminated sides of said connecting portions and the laminated sides of said spaced portions being respectively parallel with each other and with the ends of both of said spaced portions.

6. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, at least one of said spaced portions being adapted to be positioned with one of said laminated sides abutting one side of said elongated member, the other of said spaced portions being adapted to be positioned with one of said laminated sides magnetically adjacent said one side of said elongated member, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming equal obtuse angles with said intermediate portion and said spaced portions thereby giving said coil receiving window a trapezoidal configuration, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

7. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being adapted to be positioned abutting one side of said elongated member, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming obtuse angles with said intermediate portion and said spaced portions, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

8. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said spaced portions being adapted to be positioned with the laminations of one of said sides thereof abutting said elongated member, the other of said spaced portions being adapted to be positioned with the laminations of one of said sides thereof magnetically adjacent said elongated member and defining an air gap therewith, a portion intermediate said spaced portions adapted to define a coil receiving window with said elongated member, said intermediate portion having parallel laminated sides, and a pair of portions respectively integrally connecting said spaced portions and the ends of said intermediate portion, said connecting portions respectively forming obtuse angles with said intermediate portion and said spaced portions, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

9. In a magnetic core structure for an inductive device having an elongated substantially straight member formed of magnetic material with a notch formed on one side at one end thereof, a yoke member formed of a stacked plurality of relatively thin laminations of magnetic material and comprising a pair of spaced portions each having two laminated sides parallel with each other and with the laminated sides of the other spaced portion, one of said spaced portions having a projection formed on one laminated side thereof and a corresponding notch formed on the other laminated side thereof, said one spaced portion being adapted to be positioned with the laminations of said one side abutting said one side of said elongated member and with said projection seated in said notch in said elongated member, the other of said spaced portions being adapted to be positioned with said one laminated side magnetically adjacent said one side of said elongated member, a portion intermediate said spaced portions adapted to define a coil receiving window with said elongated member, said intermediate portion having parallel laminated sides, and a pair of portions respectively integrally connecting said spaced portions and the ends of said intermediate portions, said connecting portions respectively forming obtuse angles with said intermediate portion and said spaced portion, said connecting portions respectively having parallel laminated sides, the lines joining the junctions of the laminated sides of said connecting portions and the laminated sides of said intermediate portion and the lines joining the junctions of the laminated sides of said connecting portions and the laminated sides of said spaced portions being respectively parallel with each other and with the ends of both of said spaced portions.

10. In a magnetic core structure for an inductive device having an elongated substantially straight member formed of magnetic material, a yoke member formed of a stacked plurality of relatively thin laminations of magnetic material and comprising three spaced portions each having two laminated sides parallel with each other and with the laminated sides of the other spaced portions, one of said sides of each of said spaced portions being adapted to be positioned magnetically adjacent said elongated member, a pair of portions respectively intermediate said spaced portions and respectively adapted to define a pair of coil receiving windows with said elongated member, said intermediate portions respectively having parallel laminated sides, and two pairs of portions respectively integrally connecting said spaced portions and the ends of said intermediate portions, said connecting portions respectively forming obtuse angles with said intermediate portions and said spaced portions, said connecting portions respectively having parallel laminated sides, the lines joining the junctions of the laminated sides of said connecting portions and the laminated sides of said intermediate portions and the lines joining the junctions of the laminated sides of said connecting portions and the laminated sides of said spaced portions being respectively parallel with each other and with the ends of the outer two of said spaced portions.

11. In a magnetic core structure for an inductive device having an elongated substantially straight leg winding member formed of magnetic material, a yoke member formed of a stacked plurality of relatively thin laminations of magnetic material and comprising three spaced portions each having two laminated sides parallel with each other and with the laminated sides of the other spaced portions, one of said spaced portions being adapted to be positioned with one of said laminated sides abutting one side of said elongated member, the other two of said spaced portions being adapted to be respectively positioned with one of said laminated sides magnetically adjacent said one side of said elongated member and defining air gaps therewith, a pair of portions respectively intermediate said spaced portions and respectively adapted to define a pair of coil receiving windows with said elongated member, said intermediate portions respectively having parallel laminated sides, and two pairs of portions respectively integrally connecting said spaced portions and the ends of said intermediate portions, said connecting portions respectively forming equal obtuse angles with said intermediate portions and said spaced portions thereby giving said coil receiving windows a trapezoidal configuration, said connecting portions respectively having parallel laminated sides, the lines joining the junctions of the laminated sides of said connecting portions and the laminated sides of said intermediate portions and the lines joining the junctions of the laminated sides of said connecting portions and the laminated sides of said spaced portions being respectively parallel with each other and with the ends of the outer of said spaced portions.

12. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said sides of each of said spaced portions being adapted to be positioned magnetically adjacent said elongated member, and a pair of connecting portions respectively integrally joined to said spaced portions and to each other, said connecting portions respectively forming obtuse angles with said spaced portions thereby being adapted to define a triangular coil receiving window with said elongated member, said connecting portions respectively having parallel laminated sides, the lines joining the junctions of the laminated sides of said connecting portions and the laminated sides of said spaced portions and the line joining the junctions of the laminated sides of said connecting portions to each other being respectively parallel with each other and with the ends of both of said spaced portions.

13. In a magnetic core structure for an inductive device having an elongated substantially straight member formed of magnetic material, a yoke member formed of a stacked plurality of relatively thin laminations of magnetic material and comprising a pair of spaced portions each having two laminated sides parallel with each other and with the laminated sides of the other spaced portion, one of said laminated sides of each of said spaced portions being adapted to be positioned magnetically adjacent said elongated member, and a center portion integrally joined to said spaced portions, said center portion being curved with its laminated sides equally spaced throughout their length, said center portion forming obtuse angles with said spaced portions thereby being adapted to define a coil receiving window with said elongated member, the lines joining the junctions of the laminated sides of said center portion and the laminated sides of said spaced portions being respectively parallel with each other and with the ends of both of said spaced portions.

14. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, and a center portion integrally joined to said spaced portions and respectively forming angles therewith, the angles formed by the edges of said spaced portions and the edges of said center portion being obtuse, each said obtuse angle formed at one side of said lamination being the 360° supplement of a respective angle formed at the other side of said lamination.

15. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, and a center portion integrally joined to said spaced portions and respectively forming obtuse angles therewith, said center portion having edges equally spaced throughout their length, the lines joining the junctions of the edges of said center portion and the edges of said spaced portions being respectively parallel with each other and with the ends of both of said spaced portions and with the side edges of said strip of magnetic material.

16. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, a portion intermediate said spaced portions and having parallel edges, and a pair of portions respectively integrally connecting said spaced portions and the ends of said intermediate portion, said connecting portions respectively forming obtuse angles with said intermediate portion and said spaced portions, said connecting portions respectively having parallel edges, the lines joining the junctions of the edges of said connecting portions and the edges of said intermediate portion and the lines joining the junctions of the edges of said connecting portions and the edges of said spaced portions being respectively parallel with each other and parallel with the ends of both of said spaced portions and with the side edges of said strip of magnetic material.

17. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, a portion intermediate said spaced portions and having parallel edges, and a pair of portions respectively integrally connecting said spaced portions and the ends of said intermediate portion, said connecting portions respectively forming angles between 100° and 170° with said intermediate portion and between 260° and 190° with said spaced portions, said connecting portions respectively having parallel edges, the lines joining the junction of the edges of said connecting portions and the edges of said intermediate portion and the lines joining the junctions of the edges of said connecting portions and the edges of said spaced portions being respectively parallel with each other and with the ends of both of said spaced portions and with the side edges of said strip of magnetic material.

18. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, one of said spaced portions having a projection formed in one edge thereof and a corresponding notch formed on the other edge thereof, a portion intermediate said spaced portions and having parallel edges, a pair of portions respectively integrally connecting said spaced portions and the ends of said intermediate portion, said connecting portions respectively forming obtuse angles with said intermediate portion and said spaced portions, said connecting portions respectively having parallel edges, the lines joining the junctions of the edges of said connecting portions and the edges of said intermediate portion and the lines joining the junctions of the edges of said connecting portion and the edges of said spaced portions being respectively parallel with each other and with the ends of both of said spaced portions with the side edges of said strip of magnetic material.

19. A lamination for the yoke member of an inductive device adapted to be cut-off without waste from a movable elongated strip of relatively thin magnetic material comprising three spaced portions each having edges parallel with each other and respectively in substantially straight alignment with the edges of the other spaced portions, a pair of portions respectively intermediate said spaced portions and having parallel edges, and two pairs of portions respectively integrally connecting said spaced portions and the ends of said intermediate portions, said connecting portions respectively forming obtuse angles with said intermediate portions and said spaced portions, said connecting portions respectively having parallel edges, the lines joining the junctions of the edges of said connecting portions and the edges of said intermediate portions and the lines joining the junctions of the edges of said connecting portions and the edges of said spaced portions being respectively parallel with each other and with the ends of both of said spaced portions and with the side edges of said strip of magnetic material.

20. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, and a pair of connecting portions respectively integrally joined to said spaced portions and to each other, said connecting portions respectively forming obtuse angles with said spaced portions, said connecting portions respectively having parallel edges, the lines joining the junctions of the edges of said connecting portions and the edges of said spaced portions and the line joining the junctions of the edges of said connecting portions to each other being respectively parallel with each other and with the ends of both of said spaced portions and with the side edges of said strip of magnetic material.

21. A lamination for the yoke member of an inductive device adapted to be cut-off without waste from a movable elongated strip of relatively thin magnetic material comprising a pair of spaced portions each having edges parallel with each other and respectively in substantially straight alignment with the edges of the other spaced portion, and a center portion integrally joined to said spaced portions, said center portion being curved with its edges equally spaced throughout its length, said center portion forming obtuse angles with said spaced portions, the lines joining the junctions of the edges of said center portion and the edges of said spaced portions being respectively parallel with each other and with the ends of both of said spaced portions and with the side edges of said strip of magnetic material.

References Cited in the file of this patent

UNITED STATES PATENTS

| 400,972 | Thomson | Apr. 9, 1889 |
| 2,562,693 | Brooks | July 31, 1951 |
| 2,734,176 | Gould et al. | Feb. 7, 1956 |
| 2,810,113 | Clark | Oct. 15, 1957 |

FOREIGN PATENTS

| 671,823 | Great Britain | May 14, 1952 |

UNITED STATES PATENT OFFICE
CERTIFICATION OF CORRECTION

Patent No. 2,907,966                    October 6, 1959

Roy H. Dierstein

It is hereby certified that error appears in the above numbered patent requiring correction and that the said Letters Patent should read as corrected below.

Column 7, line 66 and 67, strike out "114 and 115 and center portions 116 having connecting portions"; column 9, line 48, for "wtih" read -- with --.

Signed and sealed this 11th day of July 1961.

(SEAL)
Attest:

ERNEST W. SWIDER                      DAVID L. LADD
Attesting Officer                       Commissioner of Patents